United States Patent Office 3,567,292
Patented Mar. 2, 1971

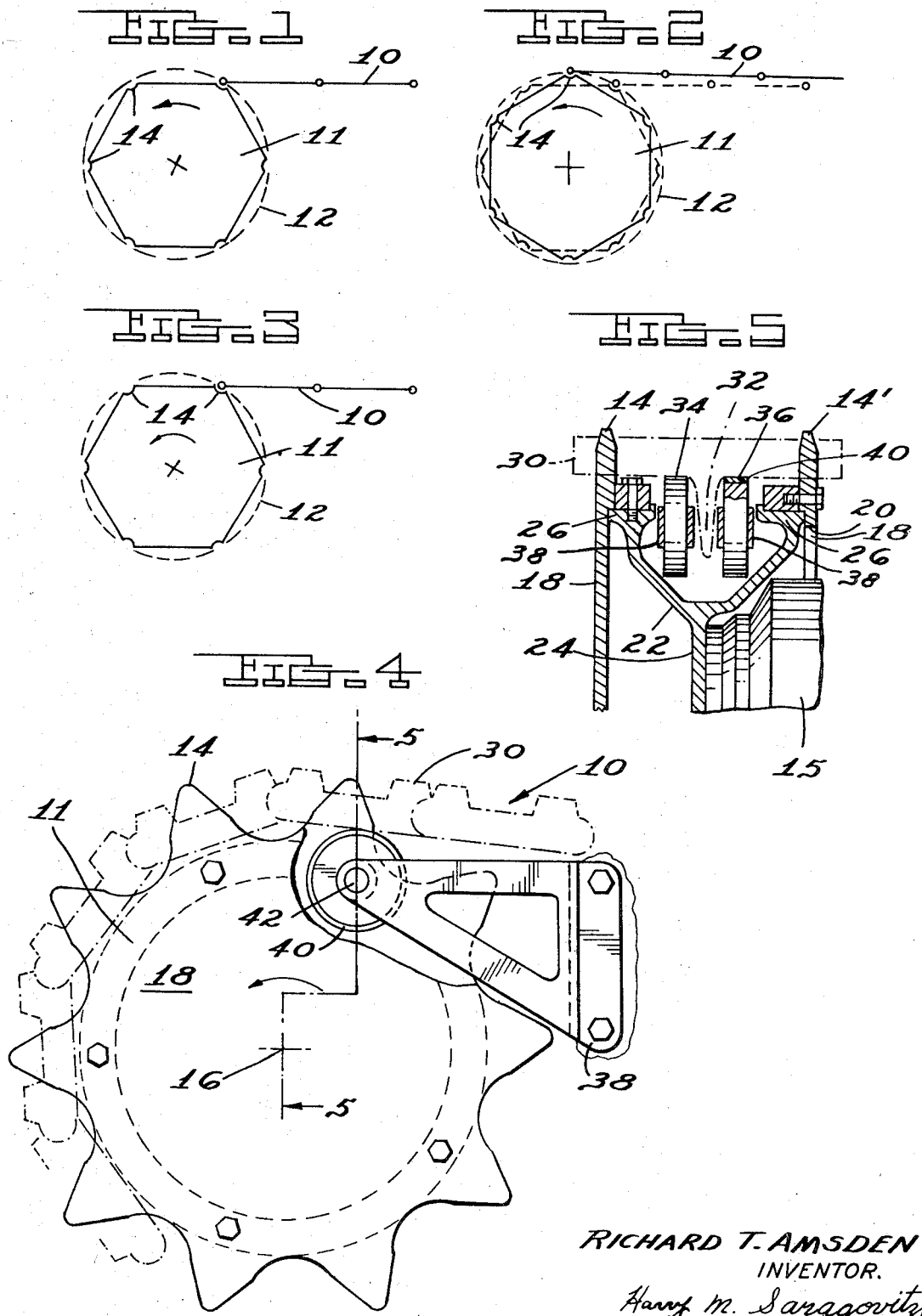

3,567,292
SPROCKET ENGAGEMENT SUPPORT WHEEL FOR
AN ENDLESS TRACK
Richard T. Amsden, Oakland, Mich., assignor to the
United States of America as represented by the Secretary of the Army
Filed Feb. 19, 1969, Ser. No. 800,422
Int. Cl. B62d 55/12
U.S. Cl. 305—57                                        2 Claims

ABSTRACT OF THE DISCLOSURE

A sprocket engagement support wheel mounted adjacent a sprocket wheel which is utilized to drive an endless track. The sprocket engagement support wheel comprises a roller, the diameter of which is small compared to the diameter of the sprocket wheel. The roller is preferably externally coated with an elastomer. The roller functions to eliminate oscillatory motion and vibration in the endless track and permits a smooth and even transmission of power from the sprocket wheel to the track.

This invention relates to sprocket wheels for an endless track and more particularly to a device for delaying engagement of the track with the teeth of the sprocket wheel. In their present state of development, track drives are relatively simple sprocket arrangements. Some military track vehicles use rubber support hubs in conjunction with the support tires, but the majority use a simple sprocket, a double sprocket being most common.

Prior art track suspension systems consume a substantial portion of engine horsepower through track flexing, sprocket engagement, and track vibration. All of the foregoing contribute to a substantially limited sprocket life. Moreover, sprocket wear due to friction in excessive impact loading creates maintenance problems. Power consumption and wear have a direct effect on vehicle operational costs and should logically be reduced as much as possible. Various ways of improving track efficiency have been tried, such as rubber bushed and solid bushed link tracks (single or double pin) and many different configurations of band tracks. Each of the above ways of improving track efficiency solves some problems but creates others.

According to the present invention, there is provided a sprocket engagement support wheel which tends to damp out the vibrations in the track by delaying abrupt contact of the track with the sprocket wheel. Before any metal to metal engagement occurs between the sprocket teeth and the track, the track shoes engage the engagement support wheel which includes a roller rotating eccentrically relative to the sprocket wheel. The outside diameter of the roller is substantially smaller than the pitch circle of the sprocket wheel. The outside of the roller is preferably covered with an elastomer. Sprocket tooth contact is retarded by the overpitching of the sprocket wheels which tends to further damp out vibration. Friction and wear are reduced. These effects help prevent energy loss and increases the life of both the sprocket and the track shoes. Any reduction in friction or wear will also reduce the horsepower requirements.

Other objects and advantages of the present invention will become apparent to those of ordinary skill in the art by the following description when considered in relation to the accompanying drawings of which:

FIGS. 1–3 diagrammatically show a track entering a sprocket wheel at various lines of approach, FIG. 4 is a side elevational view of the sprocket wheel in combination with the sprocket engagement support wheel according to the invention.

FIG. 5 is a cross sectional view taken along lines 5—5 of FIG. 4.

Referring now to the drawing, a portion of an endless track is shown schematically at 10 secured about a sprocket wheel 11, the pitch circle of which is shown at 12. As the track approaches the sprocket wheel, oscillatory motions and vibrations are set up by movement across road wheels (not shown). In addition, chordal action is a serious limiting factor in track performance. Chordal action may be described as the variation from smooth or even powered transmission to sprocket engagement. The power is transmitted with a variation in driving speed for each track segment, and the sprocket engagement is best described as a series of individual impacts. It may also be described as a vibratory motion caused by the rise and fall of the track as it goes over a small sprocket.

Reference to FIGS. 1–3 will clarify the cause and effects of chordal action. The sprocket teeth in FIGS. 1–3 are shown schematically at 14. When track 10 engages teeth 14, the line of approach is not tangent to pitch circle 12. The track wheel makes contact below the tangency line and is then lifted up to the top of the sprocket as shown in FIG. 2 at 10'. As sprocket rotation continues to the left as shown by the arrow in FIG. 3, the track drops back down again to its original line for approach from 10' to 10. Because of its fixed pitch link, the pitch line of the link cuts across the chord between the two pitched points on the sprocket and remains in this position relative to the sprocket until the track disengages. This chordal action seriously detracts from track performance in like because (1) there is very definite surge of force in a chain caused by the acceleration and deceleration of the track as it makes this chordal rise and fall (2) when the track enters the sprocket 11, the tooth gap into which the joint is to fall is rising while the chain strand is falling. Therefore, at contact, there is a very definite impact which is further aggravated by any increase in velocity. Chordal action, therefore, not only produces pulsations in the track, generates noise and vibration, but also curtails the power transmitting capacity and speed range of the system.

Referring now to FIG. 4, a sprocket wheel for an endless track is shown generally at 11. The sprocket wheel 11 is mounted on a suitable support assembly 15 which is secured to the hull of the vehicle, not shown. The sprocket wheel 11 includes first and second pluralities of axially spaced apart teeth as shown at 14 and 14', FIG. 5. The teeth are evenly distributed about the outer circumference of the sprocket wheel as shown in FIG. 4. Sprocket teeth 14 and 14' are shown as being integrally formed from plates 18, however, if desired the teeth may be individually formed and attached to a central hub. As shown in FIG. 5, the plate 18 on which teeth 14' are formed has an opening 20 therein to permit the support assembly 15 to pass therethrough.

The support wheel further includes a Y-shaped yoke 22 having an inner portion 24 secured to support assembly 15. Each of the legs 26 of the Y-shaped yoke are attached to plates 18 in any suitable manner such as bolts or shrink fit.

A portion of the endless track is shown in phantom at 30 including a plurality of articulately connected links mounted about sprocket wheel 11, FIG. 4. To guide the track about the sprocket, a track guide portion 32 is formed thereon protruding inwardly. The recessed portion between the individual legs of the Y-shaped yoke 22 accommodates the placement of the track guide portion 32.

To provide for a smooth transition between track 30 and sprocket 11, an engagement support wheel including roller means 34 and 36 is mounted adjacent the sprocket wheel 11. The roller means 34 and 36 are axially spaced apart on brackets 38 to permit sprocket guide portion 32 to fit therebetween. Shown broken away in section in FIG. 5, elastomeric member 40 is rigidly secured to the outer peripheral surface of each roller 34 and 36. Elastomeric member 40 may comprise a rubber tire vulcanized to the wheel, preferably having a durometer of 70±5. The roller means 34 and 36 rotate about axis 42 which is in spaced relation to axis 16 about which sprocket wheel 11 rotates. The relative positions of axes 42 and 16 may be changed by movement of bracket 38 on which the rollers are mounted. As shown in the drawing, the diameter of rollers 34 and 36 is substantially less than the pitch circle of the sprocket wheel, preferably being less than one-half of the pitch circle.

In operation, as the track 30 approaches the sprocket wheel 10, oscillatory motions and vibrations are set up for reasons described hereinbefore. Prior to individual links of track 30 engaging teeth 14 and 14' of the sprocket wheel, the track shoes will engage the elastomeric member 40 of the sprocket engagement support wheel. Engagement with elastomeric member 40 will delay the time in which the track engages the sprocket teeth 14 and 14'. As the track 30 engages the sprocket engagements support wheel, the track will be caused to move radially outward prior to the track engaging the teeth when the sprocket is rotated. This will further reduce the track vibrations, noise and track wear. If it is desired that the track engage the sprocket wheel at a later time, the rollers 34 and 36 can be raised upwardly by adjusting bracket 38.

The present invention therefore provides for a simple and yet effective means for eliminating chordal action and vibration in endless track tracks which are mounted on sprocket wheels by providing a smooth transition therebetween. The eccentric wheel is free wheeling and eliminates any timing problems with the sprocket. The availability of adjustment of the sprocket engagement support wheel provides flexibility in operation and provides for adjustments due to stretch and wear of the track and support wheel.

Since it is obvious that many changes and modifications can be made in the above described details without departing from the nature and spirit of the invention it is to be understood that the invention is not limited to said details except as set forth in the appended claims.

What I claim is:

1. In combination:
   a sprocket wheel for an endless track comprising:
      a hub including first and second pluralities of axially spaced apart teeth for engaging said track about a first axis, said sprocket wheel being rotatable, and
   an engagement support wheel means for said track including:
      roller means for engaging said track and moving it radially outwardly prior to said track engaging said teeth when said sprocket is rotated,
   first and second axially spaced apart rollers supported by a bracket and rotatable about a second axis in spaced relation with said first axis for engaging said track and moving it radially outward prior to said track engaging said teeth when said sprocket wheel is rotated,
   said rollers being positioned intermediate said first and second pluralities of teeth and being located with diameters within a pitch circle of said sprocket wheel, and
   said bracket being adjustably mounted adjacent said sprocket hub.

2. The combination as set forth in claim 1 wherein said rollers include elastomeric material mounted about the outer periphery of each thereof.

References Cited
UNITED STATES PATENTS

| 1,399,369 | 12/1921 | Webb | 305—57 |
| 1,946,660 | 2/1934 | Baker | 305—25 |
| 2,364,857 | 12/1944 | Law | 305—57X |
| 2,374,240 | 4/1945 | Shankman | 305—25X |
| 2,577,471 | 12/1951 | Law | 305—57X |

RICHARD J. JOHNSON, Primary Examiner